(12) United States Patent
Takaki et al.

(10) Patent No.: US 8,704,992 B2
(45) Date of Patent: Apr. 22, 2014

(54) ELECTRO-OPTIC DEVICE AND DISPLAY UNIT

(75) Inventors: Daishi Takaki, Kumamoto (JP); Fumio Takamatsu, Kumamoto (JP); Takahiro Togawa, Kumamoto (JP); Tomonori Saito, Kanagawa (JP)

(73) Assignee: Sony Corporation, Tokyo (JP)

(*) Notice: Subject to any disclaimer, the term of this patent is extended or adjusted under 35 U.S.C. 154(b) by 27 days.

(21) Appl. No.: 13/612,214

(22) Filed: Sep. 12, 2012

(65) Prior Publication Data
US 2013/0242209 A1  Sep. 19, 2013

(30) Foreign Application Priority Data
Sep. 22, 2011  (JP) ................................. 2011-208092

(51) Int. Cl.
*G02F 1/1345* (2006.01)

(52) U.S. Cl.
USPC ............ 349/152; 349/149; 349/150; 349/151

(58) Field of Classification Search
USPC .................................................. 349/149–152
See application file for complete search history.

(56) References Cited

FOREIGN PATENT DOCUMENTS

JP       2010-212622       9/2010

*Primary Examiner* — Phu Vu
(74) *Attorney, Agent, or Firm* — K&L Gates LLP (57) ABSTRACT

An electro-optic device includes: an electro-optic panel; a first flexible printed circuit; a second flexible printed circuit; and a conductive section. Each of the first flexible printed circuit and the second flexible printed circuit has a structure in which a reference potential layer and a signal potential layer are laminated after being insulated from each other, the reference potential layer applying a reference potential to the electro-optic panel, the signal potential layer applying a signal potential to the electro-optic panel, and the first flexible printed circuit and the second flexible printed circuit each having an opening in which a part of the reference potential layer is exposed. The conductive section electrically connects the part exposed in the opening of the reference potential layer in the first flexible printed circuit and the part exposed in the opening of the reference potential layer in the second flexible printed circuit to each other.

7 Claims, 10 Drawing Sheets

ELECTRO-OPTIC DEVICE AND DISPLAY UNIT

BACKGROUND

The technology relates to an electro-optic device in which flexible printed circuits (FPCs) are connected to an electro-optic panel such as a liquid crystal panel, and also relates to a display unit having the electro-optic device.

In order to supply various kinds of signals such as image signals from an external circuit to a liquid crystal panel, the liquid crystal panel and the external circuit are connected with an FPC, for example (see Japanese Unexamined Patent Application Publication No. 2010-212622, for instance). In a high-resolution liquid crystal panel, the number of signal lines is large for the high resolution. When the number of wirings exceeds that allowed to be contained in a single FPC, it is necessary to increase the number of FPCs. However, an increase in the number of FPCs results in an increase in the amount of noise emitted from the FPCs.

SUMMARY

In order to reduce the amount of noise emitted from an FPC, it is conceivable, for example, to form the FPC in a two-layered structure and provide one of the layers serve as a ground pattern having a wide area. However, even when the FPC is formed to have such a structure, the noise leaks from a side where a surface is not covered by the ground pattern. Thus, it is conceivable to form the FPC in a three-layered structure. In this three-layered structure, a layer to which a signal potential of a signal such as an image signal is applied serves as a middle layer, and upper and lower layers with the middle layer interposed therebetween each serve as a ground pattern.

In this case however, flexibility of the FPC significantly declines. This could lead to deterioration in assembling workability, and invite degradation in image quality because a strong stress is exerted on a panel due to strong tension after folding.

It is desirable to provide an electro-optic device and a display unit capable of reducing noise, without forming an FPC in a three-layered structure.

According to an embodiment of the technology, there is provided an electro-optic device including: an electro-optic panel; a first flexible printed circuit connected to a first end of the electro-optic panel; a second flexible printed circuit connected to a second end of the electro-optic panel, and bent to overlap the first flexible printed circuit; and a conductive section provided in a part where the first flexible printed circuit and the second flexible printed circuit overlap each other, wherein each of the first flexible printed circuit and the second flexible printed circuit has a structure in which a reference potential layer and a signal potential layer are laminated after being insulated from each other, the reference potential layer applying a reference potential to the electro-optic panel, the signal potential layer applying a signal potential to the electro-optic panel, and each of the first flexible printed circuit and the second flexible printed circuit having an opening in which a part of the reference potential layer is exposed, and the conductive section electrically connects the part exposed in the opening of the reference potential layer in the first flexible printed circuit and the part exposed in the opening of the reference potential layer in the second flexible printed circuit to each other.

According to an embodiment of the technology, there is provided a display unit including an illumination optical system, an electro-optic device, and a projection optical system, the electro-optic device generating image light by modulating light outputted from the illumination optical system based on an inputted image signal, and the projection optical system projecting the image light generated by the electro-optic device, the electro-optic device including: an electro-optic panel; a first flexible printed circuit connected to a first end of the electro-optic panel; a second flexible printed circuit connected to a second end of the electro-optic panel, and bent to overlap the first flexible printed circuit; and a conductive section provided in a part where the first flexible printed circuit and the second flexible printed circuit overlap each other, wherein each of the first flexible printed circuit and the second flexible printed circuit has a structure in which a reference potential layer and a signal potential layer are laminated after being insulated from each other, the reference potential layer applying a reference potential to the electro-optic panel, the signal potential layer applying a signal potential to the electro-optic panel, and each of the first flexible printed circuit and the second flexible printed circuit having an opening in which a part of the reference potential layer is exposed, and the conductive section electrically connects the part exposed in the opening of the reference potential layer in the first flexible printed circuit and the part exposed in the opening of the reference potential layer in the second flexible printed circuit to each other.

In the electro-optic device and the display unit according to the embodiments of the technology, the part exposed in the opening of the reference potential layer in the first flexible printed circuit and that in the second flexible printed circuit are electrically connected by the conductive section, in the part where the two flexible printed circuits connected to the electro-optic panel overlap each other. Since the two flexible printed circuits overlap each other, and further, the reference potential layers of the respective flexible printed circuits are electrically connected to each other by the conductive section, there is realized a circuit configuration resistant to noise, similar to a flexible printed circuit formed in a three-layered structure.

According to the electro-optic device and the display unit in the embodiments of the technology, the two flexible printed circuits overlap each other, and further, the reference potential layers of the respective flexible printed circuits are electrically connected to each other by the conductive section. Therefore, noise is allowed to be reduced, without forming the flexible printed circuit to have a three-layered structure.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

An embodiment will be described below in detail with reference to the drawings. It is to be noted that the description will be provided in the following order.
1. Embodiment
2. Modifications

1. Embodiment

[Configuration]

Figure 1:
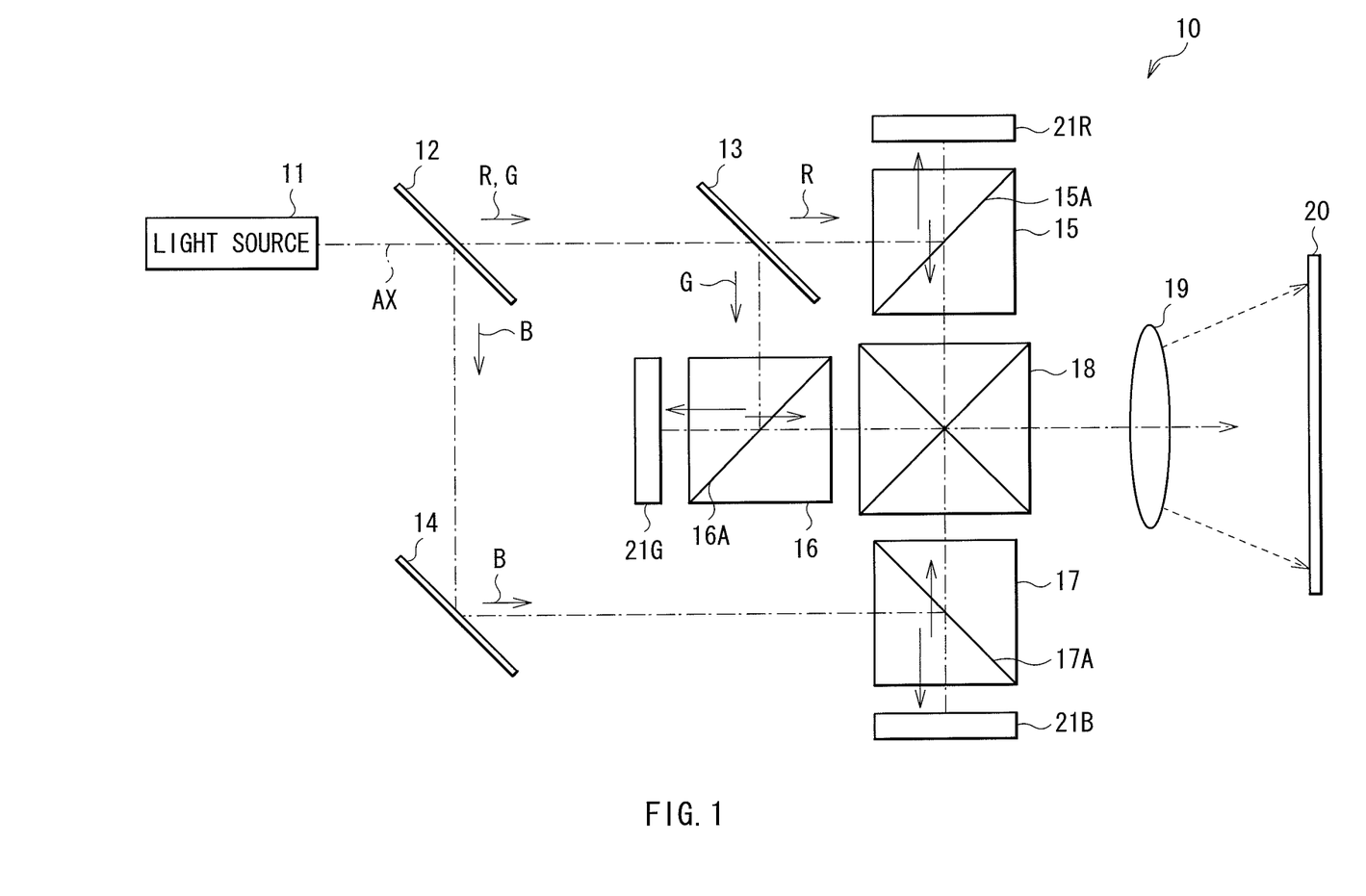
FIG. 1 is a diagram illustrating an overall configuration of a projection-type display unit according to an embodiment of the technology.

FIG. 1 illustrates an example of an overall configuration of a projection-type display unit 10 according to an embodiment of the technology. The projection-type display unit 10 projects an image which is displayed on a screen of an information processing unit not illustrated, onto a screen 20, for example. The projection-type display unit 10 is a reflection-type liquid crystal projector in which a reflection-type liquid crystal panel is used as a light valve. The projection-type display unit 10 is a so-called 3LCD in which, for example, three liquid-crystal light valves 21R, 21G, and 21B for red, green, and blue color light are used to display a color image. The projection-type display unit 10 includes, for example, a light source 11, dichroic mirrors 12 and 13, and a total reflection mirror 14. The projection-type display unit 10 further includes, for instance, polarization beam splitters 15, 16, and 17, a synthetic prism 18, and a projection lens 19. It is to be noted that an optical system including the light source 11, the dichroic mirrors 12 and 13, the total reflection mirror 14, the polarization beam splitters 15, 16, and 17, and the synthetic prism 18 is equivalent to a specific but not limitative example of "illumination optical system". In addition, the projection lens 19 is equivalent to a specific but not limitative example of "projection optical system".

The light source 11 emits white light including red light, blue light, and green light necessary for color image display. The light source 11 is configured using, for example, a halogen lamp, a metal-halide lamp, or a xenon lamp. The dichroic mirror 12 is disposed on an optical path AX of the light source 11, and has a function of separating the light from the light source 11 into blue light B and light of other colors (red light R and green light G). The dichroic mirror 13 is disposed on the optical path AX of the light source 11, and has a function of separating the light passing through the dichroic mirror 12 into the red light R and the green light G. The total reflection mirror 14 is disposed on an optical path of light reflected off the dichroic mirror 12, and reflects the blue light B resulting from the separation by the dichroic mirror 12, toward the polarization beam splitter 17.

The polarization beam splitter 15 is disposed on an optical path of the red light R, and has a function of separating the red light R incident on a polarized-light separation surface 15A into two polarized components orthogonal to each other. The polarization beam splitter 16 is disposed on an optical path of the green light G, and has a function of separating the green light G incident on a polarized-light separation surface 16A into two polarized components orthogonal to each other. The polarization beam splitter 17 is disposed on an optical path of the blue light B, and has a function of separating the blue light B incident on a polarized-light separation surface 17A into two polarized components orthogonal to each other. The polarized-light separation surfaces 15A, 16A, and 17A each reflect one polarized component (e.g., S-polarized light), and allow the other polarized component (e.g., P-polarized light) to pass therethrough.

The liquid-crystal light valves 21R, 21G, and 21B are each configured to include a reflection-type liquid crystal panel, and generate image light of each color by modulating incident light based on an inputted image signal. It is to be noted that a configuration of each of the liquid-crystal light valves 21R, 21G, and 21B will be described later in detail. The liquid-crystal light valve 21R is disposed on an optical path of the red light R reflected off the polarized-light separation surface 15A. The liquid-crystal light valve 21R is driven by, for example, a digital signal that has undergone pulse width modulation (PWM) in response to a red image signal. The liquid-crystal light valve 21R has a function of modulating the incident light by being thus driven, and reflecting the modulated light toward the polarization beam splitter 15. The liquid-crystal light valve 21G is disposed on an optical path of the green light G reflected off the polarized-light separation surface 16A. The liquid-crystal light valve 21G is driven by, for example, a digital signal that has undergone PWM in response to a green image signal. The liquid-crystal light valve 21G has a function of modulating the incident light by being thus driven, and reflecting the modulated light toward the polarization beam splitter 16. The liquid-crystal light valve 21B is disposed on an optical path of the blue light B reflected off the polarized-light separation surface 17A. The liquid-crystal light valve 21B is driven by, for example, a digital signal that has undergone PWM in response to a blue image signal. The liquid-crystal light valve 21B has a function of modulating the incident light by being thus driven, and reflecting the modulated light toward the polarization beam splitter 17.

The synthetic prism 18 is disposed at a position that is an intersection of optical paths of the respective rays of light, which are emitted from the liquid-crystal light valves 21R, 21G and 21B and then modulated by the polarization beam splitters 15, 16, and 17 while passing therethrough. The synthetic prism 18 has a function of combining the rays of the modulated light, and thereby generating color image light. The projection lens 19 is disposed on an optical path of the image light emitted from the synthetic prism 18, and has a function of projecting this image light onto the screen 20.

Figure 2:
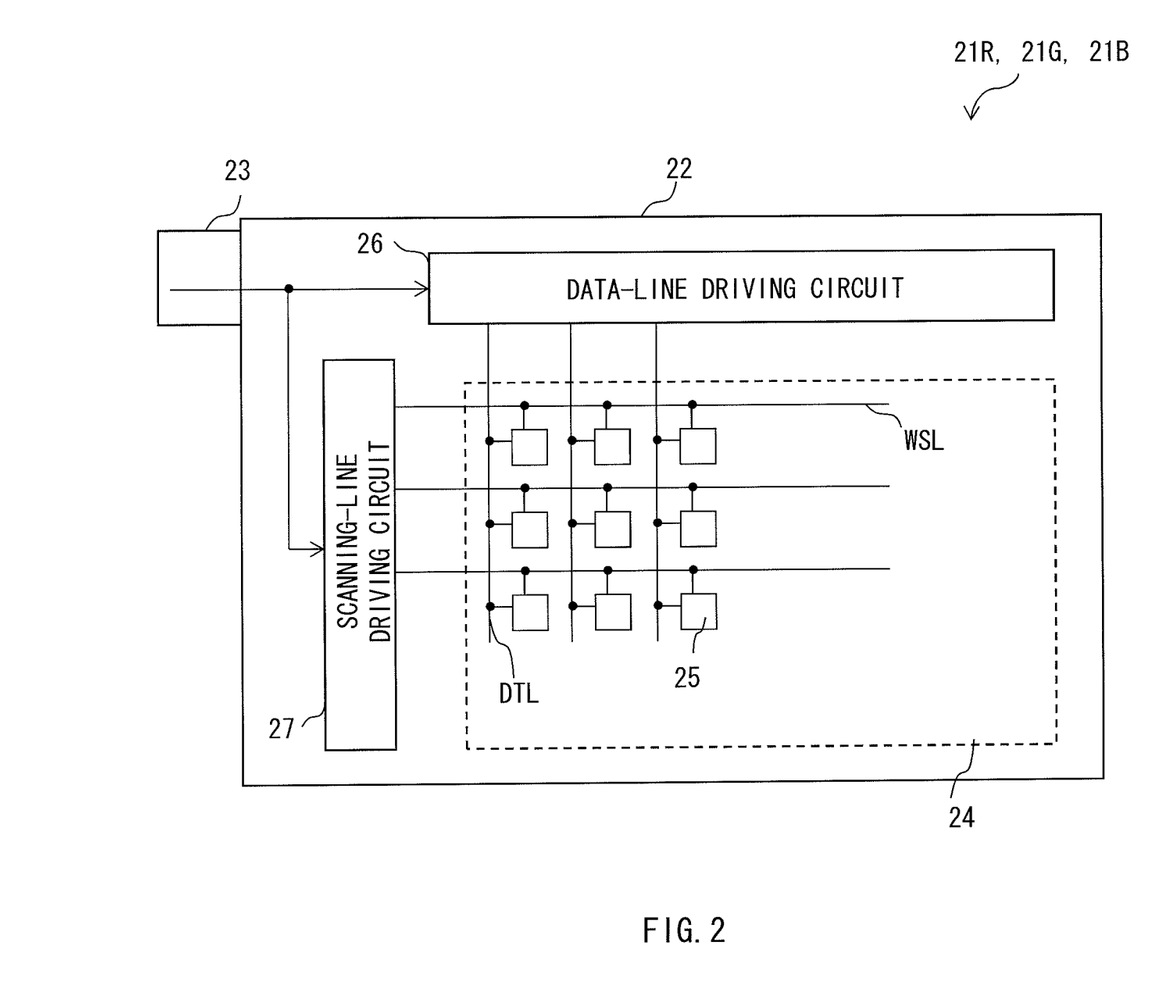
FIG. 2 is a diagram illustrating a schematic configuration of a liquid-crystal light valve in FIG. 1.

FIG. 2 illustrates an example of an overall configuration of each of the liquid-crystal light valves 21R, 21G, and 21B in FIG. 1. Each of the liquid-crystal light valves 21R, 21G, and 21B includes, for example, a panel section 22, and flexible printed circuits (FPCs) 23 (which will be hereinafter referred to as "FPC 23") connected to the panel section 22. The panel section 22 includes, for example, a pixel region 24, a data-line driving circuit 26, and a scanning-line driving circuit 27. In the pixel region 24, a plurality of pixels 25 are arranged in a matrix. The panel section 22 displays an image based on a digital signal inputted from outside, when active driving of each of the pixels 25 is performed by the data-line driving circuit 26 and the scanning-line driving circuit 27.

The panel section 22 includes a plurality of write lines WSL extending in a row direction and a plurality of signal lines DTL extending in a column direction. Each of the pixels 25 is provided to correspond to an intersection of each of the signal lines DTL and each of the write lines WSL. Each of the signal lines DTL is connected to an output terminal (not illustrated) of the data-line driving circuit 26. Each of the write lines WSL is connected to an output terminal (not illustrated) of the scanning-line driving circuit 27.

The data-line driving circuit 26 supplies, for instance, each of the pixels 25 with, as a signal voltage, a digital signal for one horizontal line supplied from outside. Specifically, for example, the data-line driving circuit 26 supplies the digital signal for one horizontal line to each of the pixels 25 forming one horizontal line selected by the scanning-line driving circuit 27, through the signal line DTL.

The scanning-line driving circuit 27 has, for example, a function of selecting the pixel 25 to be driven, in response to a scanning-timing control signal supplied from outside. Specifically, for example, the scanning-line driving circuit 27 applies a selection pulse to a selection circuit (not illustrated) of the pixel 25 through the write line WSL, thereby selecting one row of the pixels 25 formed in the matrix, as a target for driving. In these pixels 25, display of one horizontal line is performed, in response to a signal voltage supplied from the data-line driving circuit 26. In this way, the scanning-line driving circuit 27 time-divisionally scans the horizontal lines one by one sequentially, for example, thereby performing the display for the whole pixel region.

Figure 3A:
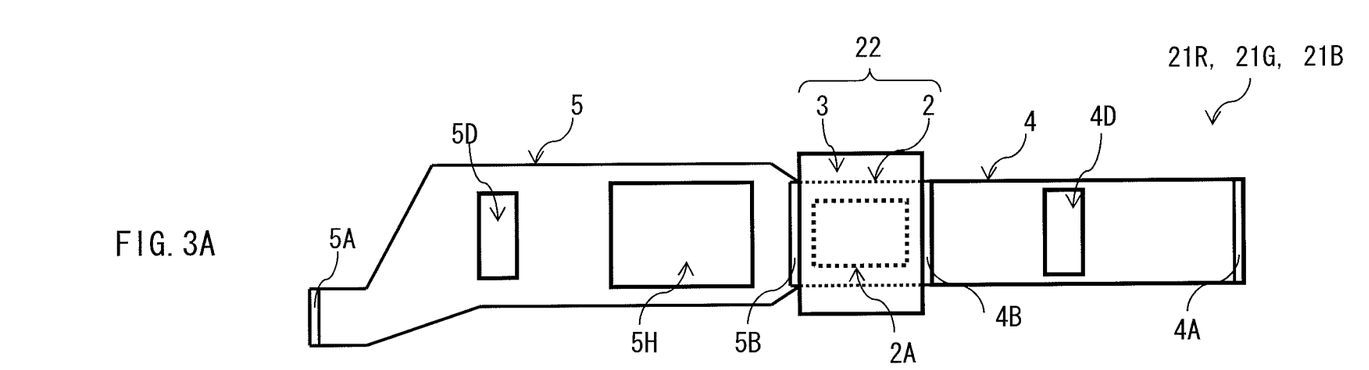
FIGS. 3A to 3C are diagrams illustrating a top-surface configuration example, an undersurface configuration example, and a side-face configuration example, respectively, when the liquid-crystal light valve in FIG. 1 is partially developed.
Figure 3B:
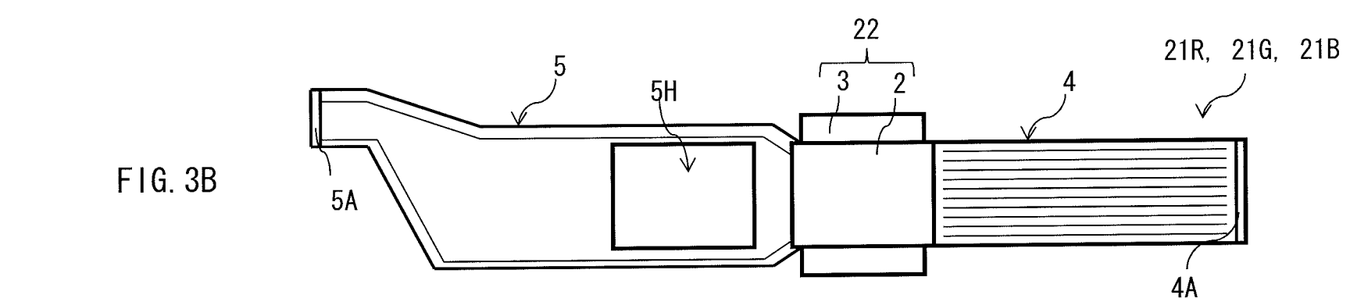
Figure 3C:
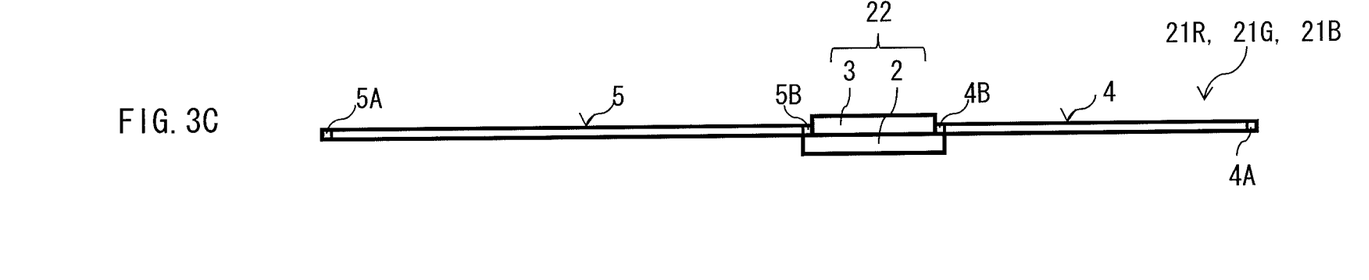

Next, an internal configuration of each of the liquid-crystal light valves 21R, 21G, and 21B will be described. FIGS. 3A and 3B each illustrate a plane configuration example where each of the liquid-crystal light valves 21R, 21G and 21B is partially developed. FIG. 3A illustrates the plane configuration example on a side provided with a surface from which the reflected light is emitted (i.e. a top-surface side). FIG. 3B illustrates the plane configuration example on a side opposite to the side provided with the surface from which the reflected light is emitted (i.e. an undersurface side). FIG. 3C illustrates a side-face configuration example. It is to be noted that each of the liquid-crystal light valves 21R, 21G, and 21B is equivalent to a specific but not limitative example of "electro-optic panel". In addition, the surface from which the reflected light is emitted is equivalent to a specific but not limitative example of "light emitting surface of the electro-optic panel".

For example, each of the liquid-crystal light valves 21R, 21G, and 21B has the panel section 22 and the FPC 23. The panel section 22 includes a liquid crystal device 2 and a protective substrate 3, and the FPC 23 includes FPCs 4 and 5. It is to be noted that the FPC 4 is equivalent to a specific but not limitative example of "first flexible printed circuit", and the FPC 5 is equivalent to a specific but not limitative example of "second flexible printed circuit". The liquid crystal device 2 is a reflection-type liquid crystal panel. Although not illustrated, the liquid crystal device 2 has a laminate in which a reflecting electrode, a liquid crystal layer, and a transparent electrode are sequentially laminated from the undersurface side of the liquid crystal device 2. The reflecting electrode functions as a pixel electrode, and the transparent electrode functions as a common electrode. The protective substrate 3 protects the liquid crystal device 2, and is configured using, for example, a member transparent to visible light (e.g., a glass substrate). The protective substrate 3 is adhered onto the top surface of the liquid crystal device 2. The protective substrate 3 has a part (a projection) not facing the liquid crystal device 2, and has a flat surface having an area larger than the liquid crystal device 2.

Each of the FPCs 4 and 5 supplies the liquid crystal device 2 with the digital signal and the scanning-timing control signal mentioned above. The number of wirings in the FPC 4 is greater than that in the FPC 5, whereas the number of wirings in the FPC 5 is smaller than that in the FPC 4. The FPC 4 has a connection terminal 4A to be connected to an external circuit, and a connection terminal 4B connected to one end of the liquid crystal device 2. The FPC 5 has a connection terminal 5A to be connected to an external circuit, and a connection terminal 5B connected to the other end of the liquid crystal device 2 (i.e., the end opposite to the end to which the FPC 4 is connected). It is preferable that the FPC 5 have such a shape that the FPC 5 overlaps most of the FPC 4 when being bent toward the undersurface side of the liquid crystal device 2. Further, it is preferable that the FPC 5 have a shape that allows a surface of the connection terminal 5A and a surface of the connection terminal 4A to agree with each other, when the FPC 5 is bent toward the undersurface side of the liquid crystal device 2.

Figure 4A:
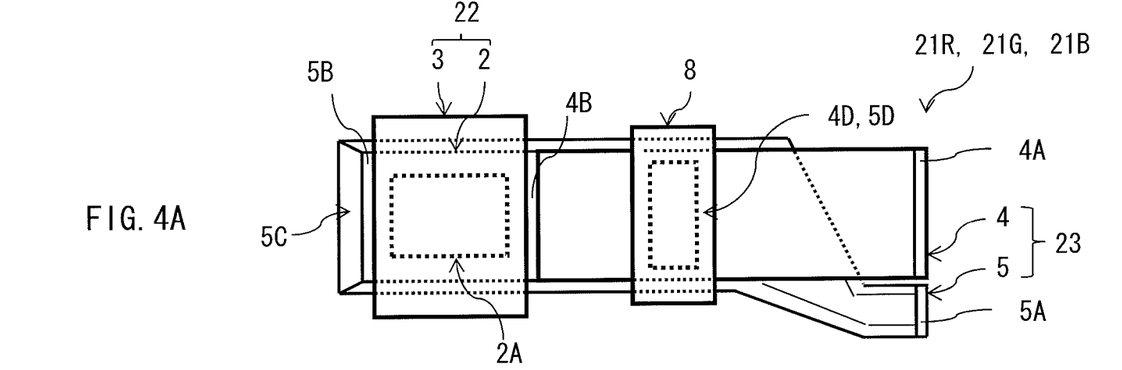
FIGS. 4A to 4C are diagrams illustrating a top-surface configuration example, an undersurface configuration example, and a side-face configuration example, respectively, when an FPC in FIGS. 3A to 3C is bent.
Figure 4B:
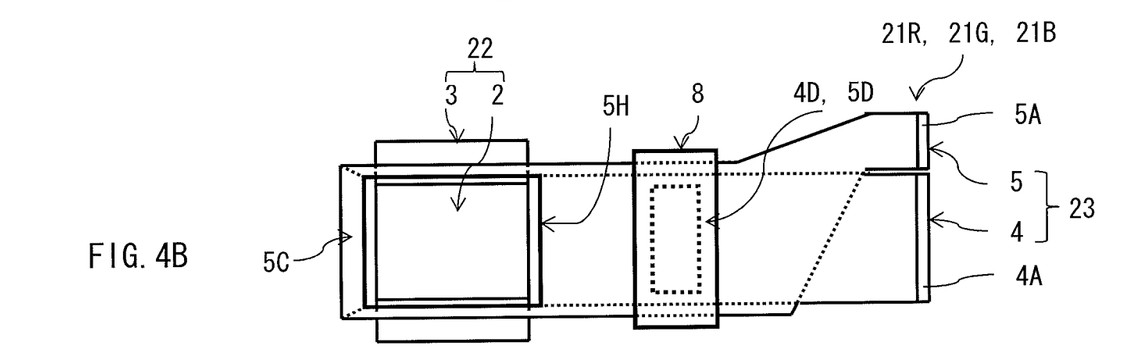
Figure 4C:
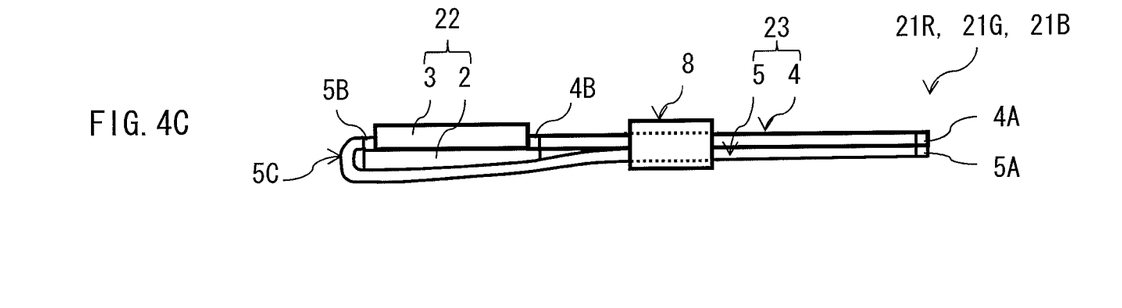

The FPC 5 has an opening 5H in a part in which no wiring is formed. The opening 5H is, for example, a hole provided in the FPC 5 to prevent the liquid crystal device 2 from being covered by the FPC 5 when the FPC 5 is bent toward the undersurface side of the liquid crystal device 2, in relation to the FPC 4, as illustrated in FIGS. 4A to 4C. Therefore, when the FPC 5 is bent toward the undersurface side of the liquid crystal device 2, the undersurface of the liquid crystal device 2 is exposed in the opening 5H, or protrudes outside the opening 5H, in relation to the FPC 4.

Figure 5A:
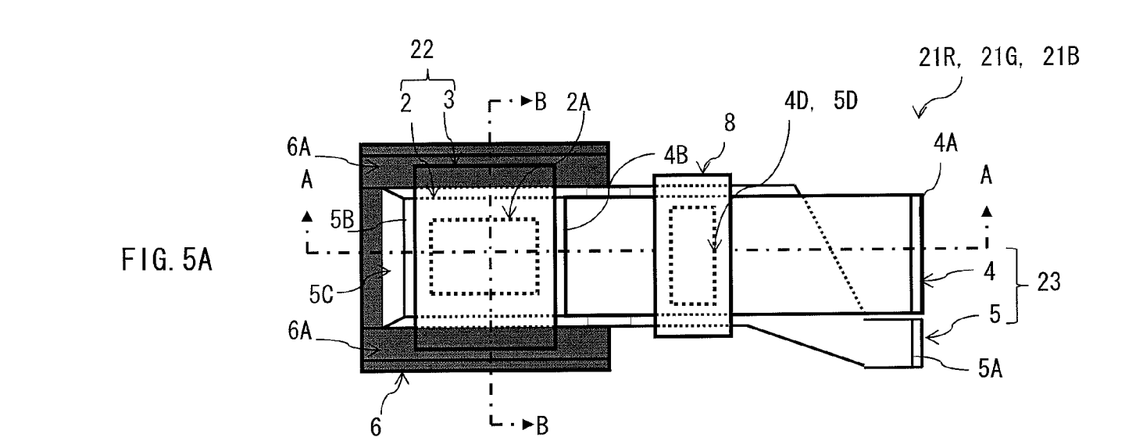
FIGS. 5A to 5C are diagrams illustrating a top-surface configuration example and cross-sectional configuration examples, when a base section is provided at the liquid-crystal light valve in FIGS. 4A to 4C.
Figure 5B:
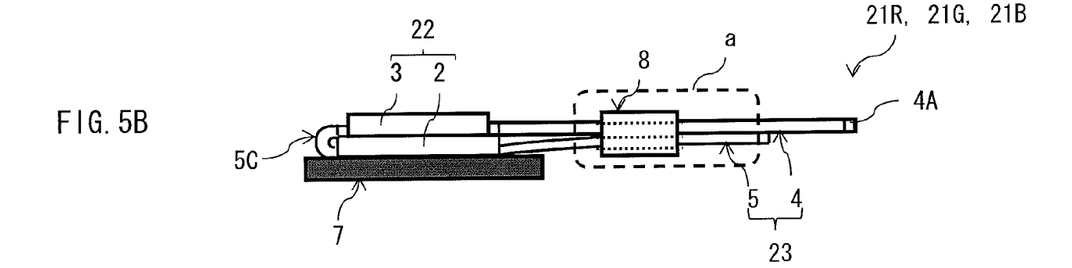
Figure 5C:
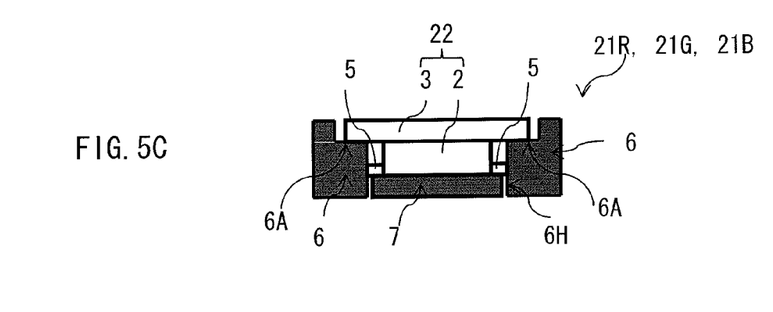

Each of the liquid-crystal light valves 21R, 21G, and 21B further includes, for example, a base section 6 and a heat sink 7 as illustrated in FIGS. 5A to 5C. The base section 6 supports the panel section 22 (specifically, the protective substrate 3), and the heat sink 7 dissipates heat generated by the liquid crystal device 2. The base section 6 has an opening 6H in a part facing the liquid crystal device 2, and a support surface 6A in a part facing the projection of the protective substrate 3. The support surface 6A supports the protective substrate 3. The heat sink 7 is provided inside the opening 6H of the base section 6. The heat sink 7 is, for example, fixed to the inside of the opening 6H of the base section 6 with an adhesive (not illustrated), and is in contact with the undersurface of the liquid crystal device 2. It is preferable that, of the heat sink 7, a surface opposite to the liquid crystal device 2 have a structure that improves heat dissipation (for example, projections and depressions).

Figure 6:
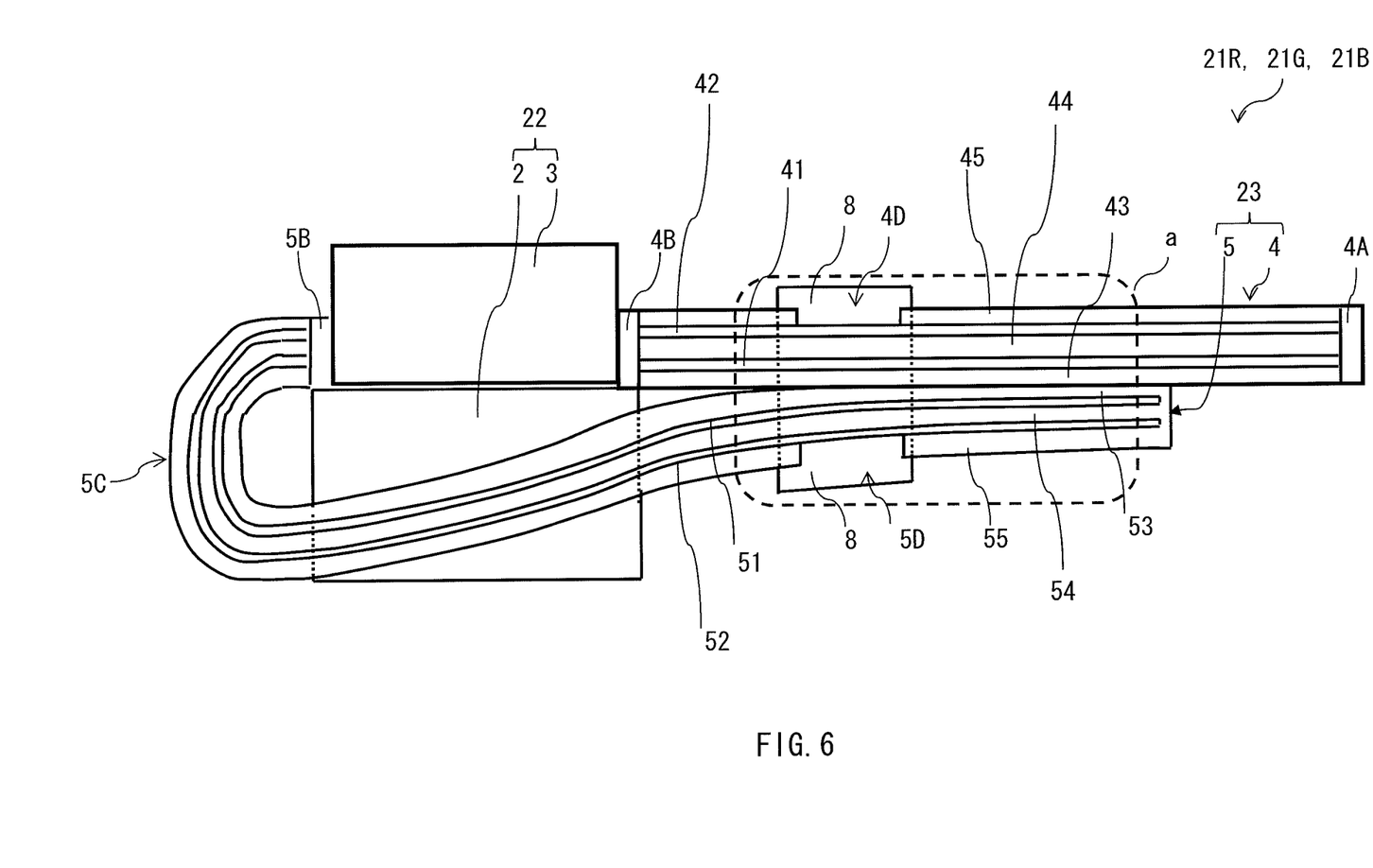
FIG. 6 is a diagram illustrating a cross-sectional configuration example when the liquid-crystal light valve in FIG. 5B is enlarged.

Next, an internal configuration of each of the FPCs 4 and 5 will be described. FIG. 6 illustrates a cross-sectional configuration example of each of the liquid-crystal light valves 21R, 21G, and 21B. The FPC 4 has, for example, a structure in which a signal potential layer 41 and a reference potential layer 42 are laminated after being insulated from each other. The signal potential layer 41 applies a signal potential to the liquid crystal device 2, and the reference potential layer 42 applies a reference potential (e.g., a ground potential) to the liquid crystal device 2. It is to be noted that the signal potential applied to the liquid crustal device 2 by the signal potential layer 41 includes, for example, electric potentials of the digital signal corresponding to the image signal, the scanning-timing control signal, and the like. Here, the light-emittingsurface side of the liquid crystal device 2 is defined as an upper side, and the side opposite to the light-emitting-surface side of the liquid crystal device 2 is defined as a lower side. Then, the FPC 4 has, for example, a structure in which the signal potential layer 41 and the reference potential layer 42 are laminated from below upward, after being insulated from each other. The signal potential layer 41 is configured of a plurality of strip-shaped wirings. The wirings in the signal potential layer 41 each extend from the connection terminal 4A to the connection terminal 4B, and are insulated electrically from one another.

The FPC 4 further includes, for example, insulating layers 43, 44, and 45. The insulating layer 43 is disposed below the signal potential layer 41. The insulating layer 44 is disposed between the signal potential layer 41 and the reference potential layer 42. The insulating layer 45 is disposed above the reference potential layer 42. The insulating layer 44 insulates the signal potential layer 41 and the reference potential layer 42 from each other. The insulating layer 43 insulates the wirings in the signal potential layer 41 from one another.

The FPC 5 has, for example, a structure in which a signal potential layer 51 and a reference potential layer 52 are laminated after being insulated from each other. The signal potential layer 51 applies a signal potential to the liquid crystal device 2, and the reference potential layer 52 applies a reference potential (e.g., a ground potential) to the liquid crystal device 2. It is to be noted that the signal potential applied to the liquid crystal device 2 by the signal potential layer 51 includes, for example, electric potentials of the digital signal corresponding to the image signal, the scanning-timing control signal, and the like. The FPC 5 includes a bent section 5C at a part slightly away from the connection terminal 5B. Of the FPC 5, a part on the connection terminal 5A side (i.e., included in an overlapping part "a" where the FPC 5 and the FPC 4 overlap each other) in relation to the bent section 5C is located on the undersurface side of the liquid crystal device 2 in relation to the FPC 4.

Here, the light-emitting-surface side of the liquid crystal device 2 is defined as the upper side, and the side opposite to the light-emitting-surface side of the liquid crystal device 2 is defined as the lower side. Then, of the FPC 5, a part on the connection terminal 5B side in relation to the bent section 5C has a structure in which the signal potential layer 51 and the reference potential layer 52 are laminated from below upward, after being insulated from each other. On the other hand, of the FPC 5, the part on the connection terminal 5A side in relation to the bent section 5C has a structure in which the reference potential layer 52 and the signal potential layer 51 are laminated from below upward, after being insulated from each other. Therefore, in the part of the FPCs 4 and 5, in which the FPCs 4 and 5 overlap each other (i.e. the overlapping part "a" in FIG. 6), the reference potential layer 52, the signal potential layer 51, the signal potential layer 41, and the reference potential layer 42 are disposed in this order from below upward.

The signal potential layer 51 is configured of a plurality of strip-shaped wirings. The wirings in the signal potential layer 51 extend from the connection terminal 5A to the connection terminal 5B, and are electrically insulated from one another. The FPC 5 further includes, for example, insulating layers 53, 54, and 55. The insulating layer 53 is disposed on an outer side (on the FPC 4 side) of the signal potential layer 51. The insulating layer 54 is disposed between the signal potential layer 51 and the reference potential layer 52. The insulating layer 55 is disposed on an outer side of the reference potential layer 52. The insulating layer 54 insulates the signal potential layer 51 and the reference potential layer 52 from each other.

The insulating layer 53 insulates the wirings in the signal potential layer 51 from one another.

The FPC 4 further includes, for example, a depression section 4D that exposes a part of the reference potential layer 42, as illustrated in FIG. 3A to FIG. 6. The depression section 4D is an opening formed in the insulating layer 45. The depression section 4D is formed, for example, in the part overlapping the FPC 5, of the FPC 4 (i.e. in the overlapping part "a" in the figures), and is formed in a surface on the light-emitting-surface side of the liquid crystal device 2. On the other hand, the FPC 5 further includes, for example, a depression section 5D that exposes a part of the reference potential layer 52, as illustrated in FIG. 3A to FIG. 6. The depression section 5D is an opening formed in the insulating layer 55. The depression section 5D is formed, for example, in the part overlapping the FPC 4, of the FPC 5 (i.e. in the overlapping part "a" in the figures), and is formed in a surface on the undersurface side of the FPC 5.

Each of the liquid-crystal light valves 21R, 21G, and 21B further includes, for example, a conductive section 8, as illustrated in FIG. 3A to FIG. 6. The conductive section 8 electrically connects the part exposed in the opening in the reference potential layer 42 of the FPC 4 and the part exposed in the opening in the reference potential layer 52 of the FPC 5 to each other. The conductive section 8 is formed to wrap around the FPC 4 and the FPC 5 from outside, for example. The conductive section 8 is configured of, for instance, a conductive tape. Alternatively, the conductive section 8 is configured of a tape or a film in which only a surface to contact the reference potential layers 42 and 52 has conductivity.

[Operation]

In the projection-type display unit 10 of the present embodiment, the white light emitted from the light source 11 is, at first, separated into the blue light B and the light of other colors (the red light R and the green light G) by the dichroic mirror 12. The blue light B is reflected off the total reflection mirror 14 toward the polarization beam splitter 17. On the other hand, the light of other colors including the red light R and the green light G are separated into the red light R and the green light G by the dichroic mirror 13. The red light R resulting from the separation enters the polarization beam splitter 15, while the green light G resulting from the separation enters the polarization beam splitter 16.

In the polarization beam splitters 15, 16, and 17, the rays of the respective colors incident thereupon are each separated into the two polarized components orthogonal to each other, on the polarized-light separation surfaces 15A, 16A, and 17A, respectively. At this moment, one of the polarized components (e.g., S-polarized light) is reflected toward each of the liquid-crystal light valves 21R, 21G, and 21B. Here, each of the liquid-crystal light valves 21R, 21Q and 21B is driven by the digital signal that has undergone the pulse width modulation (PWM) in response to the image signal of each color. Therefore, each ray of the polarized light is thereby modulated for each of the pixels 25, and this modulated ray enters the synthetic prism 18 after passing through each of the polarization beam splitters 15, 16, and 17. The respective rays of modulated light are combined by the synthetic prism 18, and the color image light obtained thereby is projected onto the screen 20 by the projection lens 19. In this way, a color image is displayed on the screen 20.

[Effects]

Next, effects of the projection-type display unit 10 of the present embodiment will be described. In the present embodiment, the parts exposed in the openings of the reference potential layers 42 and 52 in the respective FPCs 4 and 5 are electrically connected to each other by the conductive section 8, in the part of the FPCs 4 and 5, in which the FPCs 4 and 5 connected to the panel section 22 overlap each other (i.e. in the overlapping part "a" in the figures). In this way, the two FPCs 4 and 5 are disposed to overlap each other, and further, the reference potential layers 42 and 52 of the FPCs 4 and 5 are electrically connected to each other by the conductive section 8. Thus, there is realized a circuit configuration resistant to noise, similar to a case where a flexible printed circuit is formed in a three-layered structure. As a result, noise is allowed to be reduced, without forming the flexible printed circuit to have a three-layered structure.

2. Modifications

First Modification

Figure 7:
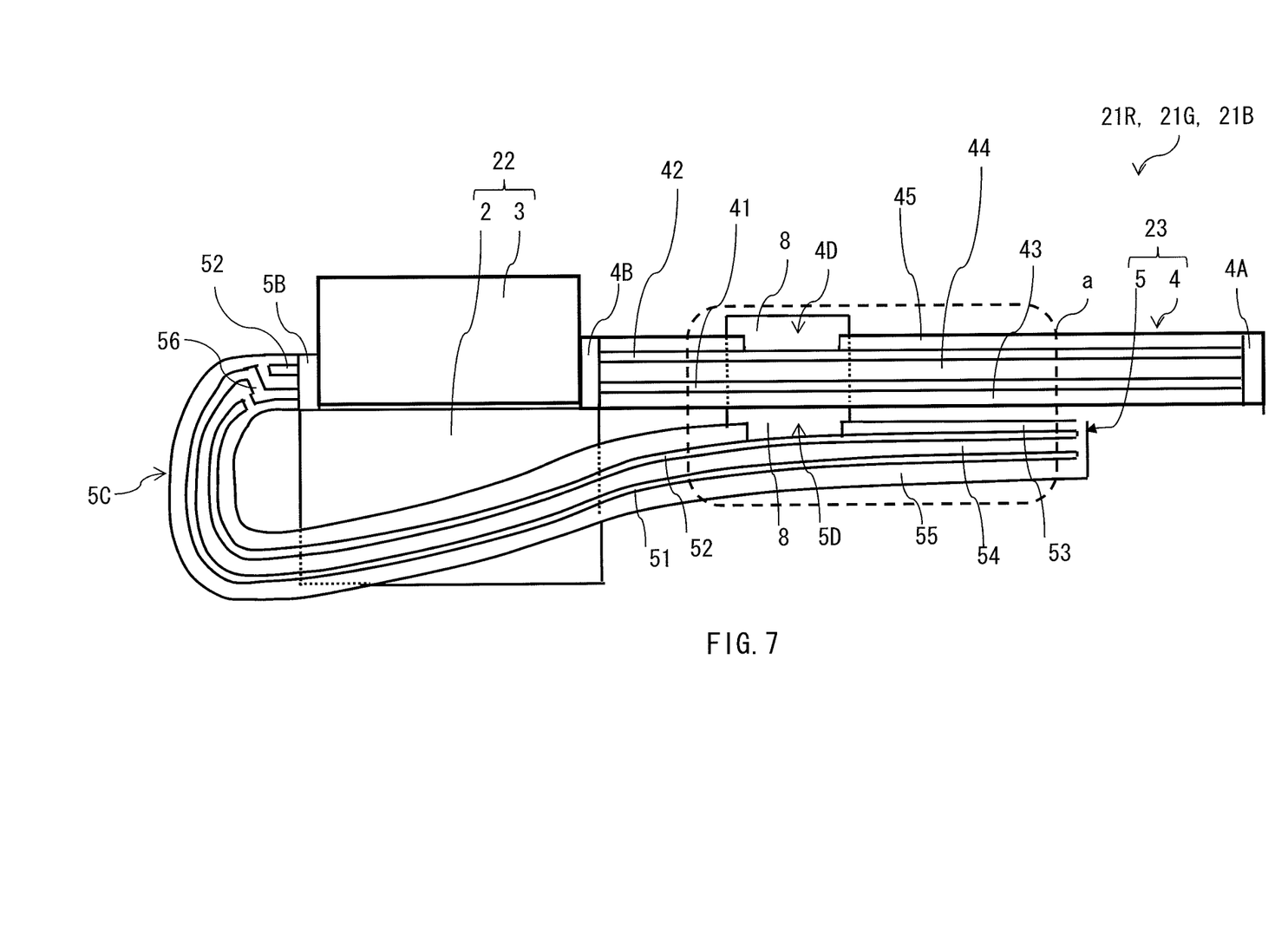
FIG. 7 is a diagram illustrating a first modification of the liquid-crystal light valve in FIGS. 3A to 3C.

In the embodiment, the layered structure is common to the entire FPC 5. However, for example, the FPC 5 may have a contact 56 at a part on the connection terminal 5B side in relation to the bent section 5C, as illustrated in FIG. 7. The contact 56 reverses the laminating order of the reference potential layer 52 and the signal potential layer 51.

The contact 56 electrically connects a conductive layer disposed below the liquid crystal device 2 at the connection terminal 5B, to a conductive layer disposed above the liquid crystal device 2 at a part away from the connection terminal 5B. Further, the contact 56 electrically connects a conductive layer disposed above the liquid crystal device 2 at the connection terminal 5B, to a conductive layer disposed below the liquid crystal device 2 in a part away from the connection terminal 5B. Here, the light-emitting-surface side of the liquid crystal device 2 is defined as the upper side, and the side opposite to the light-emitting-surface side of the liquid crystal device 2 is defined as the lower side. Then, of the FPC 5, a part on the connection terminal 5B side in relation to the contact 56 has a structure in which the signal potential layer 51 and the reference potential layer 52 are laminated from below upward after being insulated from each other. Similarly, of the FPC 5, a part on the connection terminal 5A side in relation to the contact 56 also has a structure in which the signal potential layer 51 and the reference potential layer 52 are laminated from below upward after being insulated from each other. Therefore, in the part of the FPCs 4 and 5, in which the FPCs 4 and 5 overlap each other (i.e. in the overlapping part "a" in the figure), the signal potential layer 51, the reference potential layer 52, the signal potential layer 41, and the reference potential layer 42 are laminated in this order from below upward.

Figure 8A:
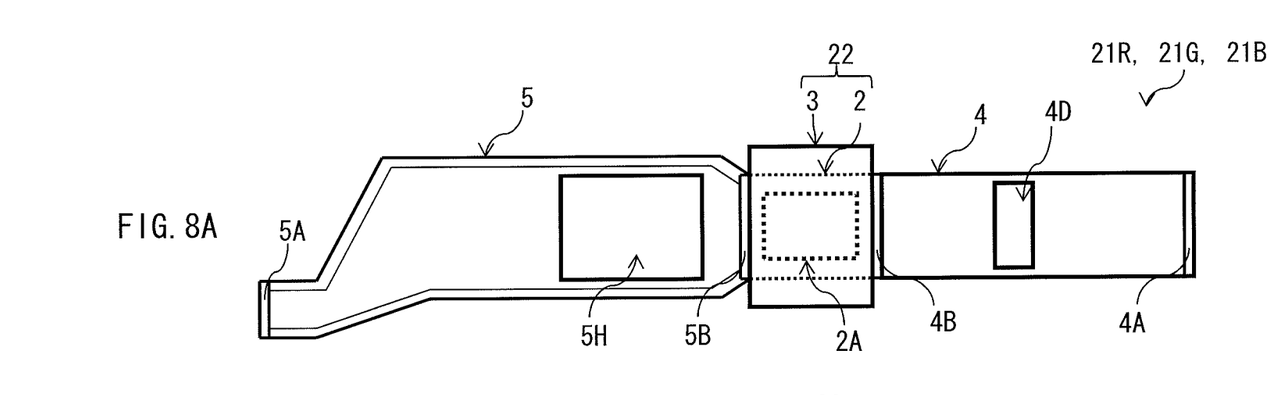
FIGS. 8A to 8C are diagrams illustrating a top-surface configuration example, an undersurface configuration example, and a side-face configuration example, respectively, when the liquid-crystal light valve in FIG. 7 is partially developed.
Figure 8B:
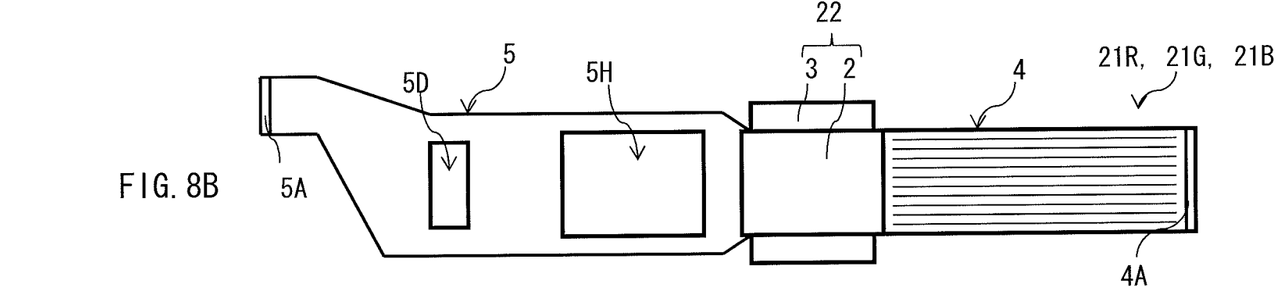
Figure 8C:
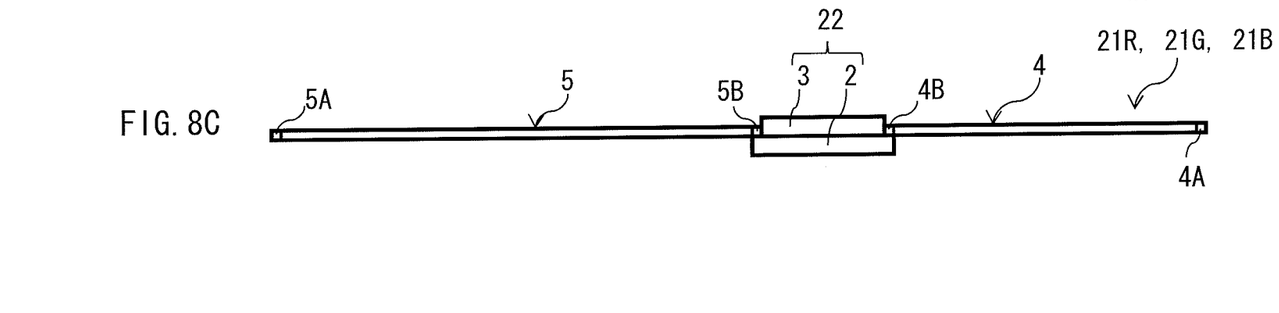

FIGS. 8A and 8B illustrate each illustrate a plane configuration example when each of the liquid-crystal light valves 21R, 21G, and 21B is partially developed. FIG. 8A illustrates the plane configuration example of the side from which the reflected light is emitted (the top-surface side). FIG. 8B illustrates the plane configuration example of the side opposite to the side from which the reflected light is emitted (the under-surface side). FIG. 8C illustrates a side-face configuration example.

The FPC 4 includes, for example, the depression section 4D that exposes a part of the reference potential layer 42, as illustrated in FIG. 7 and FIG. 8A. The depression section 4D is an opening formed in the insulating layer 45, and is formed, for example, in the part of the FPC 4 overlapping the FPC 5 (i.e. in the overlapping part "a" in the figure). The depression section 4D is formed in a surface on the light-emitting-surface side of the liquid crystal device 2. The FPC 5 also further includes, for example, the depression section 5D that exposes a part of the reference potential layer 52, as illustrated in FIG. 7 and FIG. 8B. In the present modification, the depression section 5D is an opening formed in the insulating layer 53. The depression section 5D is formed, for example, in the part of the FPC 5 overlapping the FPC 4 (i.e. in the overlapping part "a" in the figure), and is formed in a surface on the top-surface side of the FPC 5 (i.e. the surface facing the FPC 4).

In the present modification, for example, the conductive section 8 is formed to wrap around the FPC 4 from outside. The conductive section 8 is configured of, for instance, a conductive tape, or a tape or a film having conductivity on both sides.

In the present modification, the parts exposed in the openings of the reference potential layers 42 and 52 in the respective FPCs 4 and 5 are electrically connected to each other by the conductive section 8, in the part of the FPCs 4 and 5, in which the FPCs 4 and 5 connected to the panel section 22 overlap each other (i.e. in the overlapping part "a" in the figure). In this way, the two FPCs 4 and 5 are disposed to overlap each other, and further, the reference potential layers 42 and 52 of the FPCs 4 and 5 are electrically connected to each other by the conductive section 8. Thus, there is realized a circuit configuration resistant to noise, similar to a case where a flexible printed circuit is formed in a three-layered structure. As a result, noise is allowed to be reduced, without forming the flexible printed circuit to have a three-layered structure.

Second Modification

Figure 9:
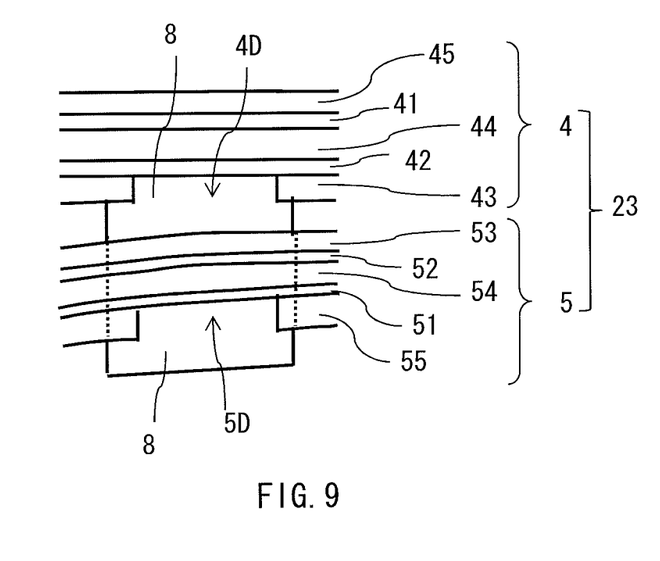
FIG. 9 is a diagram illustrating a second modification of the liquid-crystal light valve in FIGS. 3A to 3C.

For example, in the FPC 4, the reference potential layer 42 may be disposed closer to the FPC 5, and the signal potential layer 41 may be disposed farther away from the FPC 5 than the reference potential layer 42, as illustrated in FIG. 9. Further, in the FPC 5, the signal potential layer 51 may be disposed closer to the FPC 4, and the reference potential layer 52 may be disposed farther away from the FPC 4 than the signal potential layer 51, as illustrated in FIG. 9. In this case, for example, the conductive section 8 is formed to wrap around the FPC 5 from outside.

Third Modification

Figure 10:
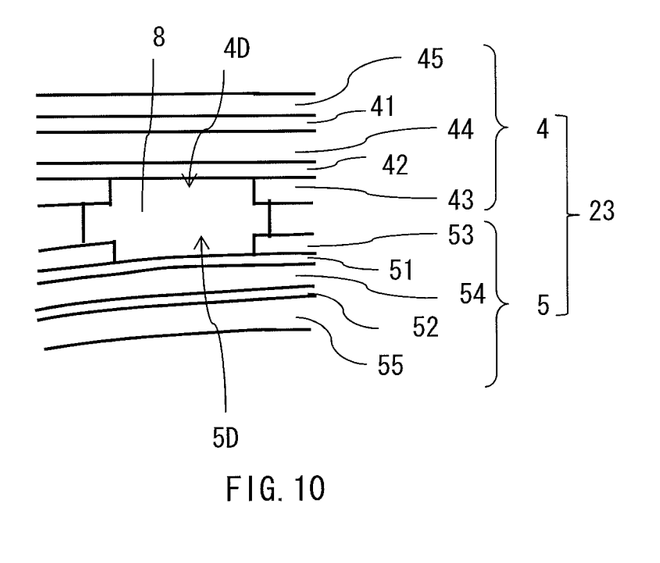
FIG. 10 is a diagram illustrating a third modification of the liquid-crystal light valve in FIGS. 3A to 3C.

For instance, in the FPC 4, the reference potential layer 42 may be disposed closer to the FPC 5, and the signal potential layer 41 may be disposed farther away from the FPC 5 than the reference potential layer 42, as illustrated in FIG. 10. Further, in the FPC 5, the reference potential layer 52 may be disposed closer to the FPC 4, and the signal potential layer 51 may be disposed farther away from the FPC 4 than the reference potential layer 52, as illustrated in FIG. 10. In this case, the conductive section 8 is, for example, a sheet-like tape inserted between the FPC 4 and the FPC 5.

Accordingly, it is possible to achieve at least the following configurations from the above-described example embodiments, and the modifications of the disclosure.
(1) An electro-optic device including:
    an electro-optic panel;
    a first flexible printed circuit connected to a first end of the electro-optic panel;
    a second flexible printed circuit connected to a second end of the electro-optic panel, and bent to overlap the first flexible printed circuit; and
    a conductive section provided in a part where the first flexible printed circuit and the second flexible printed circuit overlap each other, wherein each of the first flexible printed circuit and the second flexible printed circuit has a structure in which a reference potential layer and a signal potential layer are laminated after being insulated from each other, the reference potential layer applying a reference potential to the electro-optic panel, the signal potential layer applying a signal potential to the electro-optic panel, and each of the first flexible printed circuit and the second flexible printed circuit having an opening in which a part of the reference potential layer is exposed, and the conductive section electrically connects the part exposed in the opening of the reference potential layer in the first flexible printed circuit and the part exposed in the opening of the reference potential layer in the second flexible printed circuit to each other.

(2) The electro-optic device according to (1), wherein when a light-emitting-surface side of the electro-optic panel is defined as an upper side and a side opposite to the light-emitting-surface side of the electro-optic panel is defined as a lower side, the part where the first flexible printed circuit and the second flexible printed circuit overlap each other includes the reference potential layer, the signal potential layer, the signal potential layer, and the reference potential layer laminated in this order from below upward, and the conductive section is formed to wrap around the first flexible printed circuit and the second flexible printed circuit from outside.

(3) The electro-optic device according to (1), wherein when a light-emitting-surface side of the electro-optic panel is defined as an upper side and a side opposite to the light-emitting-surface side of the electro-optic panel is defined as a lower side, the part where the first flexible printed circuit and the second flexible printed circuit overlap each other includes the signal potential layer, the reference potential layer, the signal potential layer, and the reference potential layer laminated in this order from below upward, and the conductive section is formed to wrap around the flexible printed circuit on the upper side, of the first flexible printed circuit and the second flexible printed circuit, from outside.

(4) The electro-optic device according to (3), wherein, of the first flexible printed circuit and the second flexible printed circuit, the flexible printed circuit on the lower side has a contact structure, in a part not overlapping the flexible printed circuit on the upper side of the first flexible printed circuit and the second flexible printed circuit, the contact structure reversing a laminating order of the signal potential layer and the reference potential layer.

(5) The electro-optic device according to any one of (1) to (4), wherein the signal potential layer included in each of the first flexible printed circuit and the second flexible printed circuit is configured of a plurality of strip-shaped wirings, and the wirings of the first flexible printed circuit are greater in number than that of the second flexible printed circuit.

(6) The electro-optic device according to any one of (1) to (5), wherein, of the second flexible printed circuit, a part overlapping the first flexible printed circuit is disposed on a side opposite to a light emitting surface of the electro-optic panel.

(7) A display unit including an illumination optical system, an electro-optic device, and a projection optical system, the electro-optic device generating image light by modulating light outputted from the illumination optical system based on an inputted image signal, and the projection optical system projecting the image light generated by the electro-optic device, the electro-optic device including:

an electro-optic panel;

a first flexible printed circuit connected to a first end of the electro-optic panel;

a second flexible printed circuit connected to a second end of the electro-optic panel, and bent to overlap the first flexible printed circuit; and a conductive section provided in a part where the first flexible printed circuit and the second flexible printed circuit overlap each other, wherein each of the first flexible printed circuit and the second flexible printed circuit has a structure in which a reference potential layer and a signal potential layer are laminated after being insulated from each other, the reference potential layer applying a reference potential to the electro-optic panel, the signal potential layer applying a signal potential to the electro-optic panel, and each of the first flexible printed circuit and the second flexible printed circuit having an opening in which a part of the reference potential layer is exposed, and the conductive section electrically connects the part exposed in the opening of the reference potential layer in the first flexible printed circuit and the part exposed in the opening of the reference potential layer in the second flexible printed circuit to each other.

The present application claims priority to Japanese Priority Patent Application JP 2011-208092 filed in the Japan Patent Office on Sep. 22, 2011, the entire content of which is hereby incorporated by reference.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electro-optic device comprising:

an electro-optic panel;

a first flexible printed circuit connected to a first end of the electro-optic panel;

a second flexible printed circuit connected to a second end of the electro-optic panel, and bent to overlap the first flexible printed circuit; and a conductive section provided in a part where the first flexible printed circuit and the second flexible printed circuit overlap each other, wherein each of the first flexible printed circuit and the second flexible printed circuit has a structure in which a reference potential layer and a signal potential layer are laminated after being insulated from each other, the reference potential layer applying a reference potential to the electro-optic panel, the signal potential layer applying a signal potential to the electro-optic panel, and each of the first flexible printed circuit and the second flexible printed circuit having an opening in which a part of the reference potential layer is exposed, and the conductive section electrically connects the part exposed in the opening of the reference potential layer in the first flexible printed circuit and the part exposed in the opening of the reference potential layer in the second flexible printed circuit to each other.

2. The electro-optic device according to claim 1, wherein when a light-emitting-surface side of the electro-optic panel is defined as an upper side and a side opposite to the light-emitting-surface side of the electro-optic panel is defined as a lower side, the part where the first flexible printed circuit and the second flexible printed circuit overlap each other includes the reference potential layer, the signal potential layer, the signal potential layer, and the reference potential layer laminated in this order from below upward, and the conductive section is formed to wrap around the first flexible printed circuit and the second flexible printed circuit from outside.

3. The electro-optic device according to claim 1, wherein when a light-emitting-surface side of the electro-optic panel is defined as an upper side and a side opposite to the light-emitting-surface side of the electro-optic panel is defined as a lower side, the part where the first flexible printed circuit and the second flexible printed circuit overlap each other includes the signal potential layer, the reference potential layer, the signal potential layer, and the reference potential layer laminated in this order from below upward, and the conductive section is formed to wrap around the flexible printed circuit on the upper side, of the first flexible printed circuit and the second flexible printed circuit, from outside.

4. The electro-optic device according to claim 3, wherein, of the first flexible printed circuit and the second flexible printed circuit, the flexible printed circuit on the lower side has a contact structure, in a part not overlapping the flexible printed circuit on the upper side of the first flexible printed circuit and the second flexible printed circuit, the contact structure reversing a laminating order of the signal potential layer and the reference potential layer.

5. The electro-optic device according to claim 1, wherein the signal potential layer included in each of the first flexible printed circuit and the second flexible printed circuit is configured of a plurality of strip-shaped wirings, and the wirings of the first flexible printed circuit are greater in number than that of the second flexible printed circuit.

6. The electro-optic device according to claim 1, wherein, of the second flexible printed circuit, a part overlapping the first flexible printed circuit is disposed on a side opposite to a light emitting surface of the electro-optic panel.

7. A display unit including an illumination optical system, an electro-optic device, and a projection optical system, the electro-optic device generating image light by modulating light outputted from the illumination optical system based on an inputted image signal, and the projection optical system projecting the image light generated by the electro-optic device, the electro-optic device comprising:

an electro-optic panel;

a first flexible printed circuit connected to a first end of the electro-optic panel;

a second flexible printed circuit connected to a second end of the electro-optic panel, and bent to overlap the first flexible printed circuit; and a conductive section provided in a part where the first flexible printed circuit and the second flexible printed circuit overlap each other, wherein each of the first flexible printed circuit and the second flexible printed circuit has a structure in which a reference potential layer and a signal potential layer are laminated after being insulated from each other, the reference potential layer applying a reference potential to the electro-optic panel, the signal potential layer applying a signal potential to the electro-optic panel, and each of the first flexible printed circuit and the second flexible printed circuit having an opening in which a part of the reference potential layer is exposed, and the conductive section electrically connects the part exposed in the opening of the reference potential layer in the first flexible printed circuit and the part exposed in the opening of the reference potential layer in the second flexible printed circuit to each other.

* * * * *